United States Patent [19]

Janson

[11] Patent Number: 4,989,713

[45] Date of Patent: * Feb. 5, 1991

[54] TORISONAL DAMPING MECHANISM

[75] Inventor: David A. Janson, Plymouth, Mich.

[73] Assignee: Eaton Corporation, Cleveland, Ohio

[*] Notice: The portion of the term of this patent subsequent to Nov. 8, 2005 has been disclaimed.

[21] Appl. No.: 355,603

[22] Filed: May 22, 1989

Related U.S. Application Data

[60] Continuation of Ser. No. 111,472, Oct. 19, 1987, abandoned, which is a division of Ser. No. 793,802, Nov. 1, 1985, Pat. No. 4,782,932.

[51] Int. Cl.$^5$ .............. F16D 3/12; F16D 3/66; F16D 3/80
[52] U.S. Cl. .............. 192/106.2; 192/58 B; 192/106.1; 464/24; 464/66
[58] Field of Search ............ 192/70.17, 58 B, 106.1, 192/106.2, 30 V; 464/24, 66, 68

[56] References Cited

U.S. PATENT DOCUMENTS

| | | | |
|---|---|---|---|
| 2,316,820 | 4/1943 | Thelander | 192/106.2 |
| 2,337,134 | 12/1943 | Thelander | 192/106.2 |
| 2,513,379 | 7/1950 | Thelander | 192/106.2 |
| 2,674,863 | 1/1954 | Thelander | 192/106.2 X |
| 2,902,127 | 9/1959 | Hardey | 192/58 B |
| 4,082,139 | 4/1978 | Davis | 165/8 |
| 4,148,200 | 4/1979 | Schallhorn et al. | 192/106.1 X |
| 4,212,380 | 7/1980 | Billet | 192/106.2 |
| 4,351,167 | 9/1982 | Hanke et al. | 464/24 |
| 4,440,283 | 4/1984 | Nioloux | 192/106.2 |
| 4,557,357 | 12/1985 | Tinholt | 192/106.2 X |
| 4,565,273 | 1/1986 | Tojima et al. | 192/106.2 |
| 4,576,259 | 3/1986 | Bopp | 192/58 B X |
| 4,602,676 | 7/1986 | Tojima | 464/24 |
| 4,608,883 | 9/1986 | Bopp | 464/24 X |
| 4,643,283 | 2/1987 | Wonn | 464/66 X |
| 4,674,991 | 6/1987 | Tojima et al. | 464/24 |
| 4,703,840 | 11/1987 | Bopp | 192/106.1 X |
| 4,782,932 | 11/1988 | Janson | 192/70.17 |
| 4,790,792 | 12/1988 | Bopp | 464/66 |

FOREIGN PATENT DOCUMENTS 154088 9/1985 European Pat. Off. .............. 464/24

Primary Examiner—Richard Lorance
Attorney, Agent, or Firm—P. S. Rulon

[57] ABSTRACT

A torsional damping mechanism (22) adapted to be disposed between an engine (10) and a transmission (12) operative to drive ground wheels (16) of a vehicle. The mechanism includes a viscous damping device (30), an idle rattle assembly (32), a torque transmitting torsion spring bar (28) disposed in series with the idle rattle assembly and in parallel with the viscous damping device, and a mechanical friction assembly for connecting the mechanism to the engine. Mechanism (22) is structurally configured to have a low inertia. The viscous damping device includes lost motion means (48k, 50c) which allows attenuation of low amplitude torsionals without damping.

14 Claims, 2 Drawing Sheets

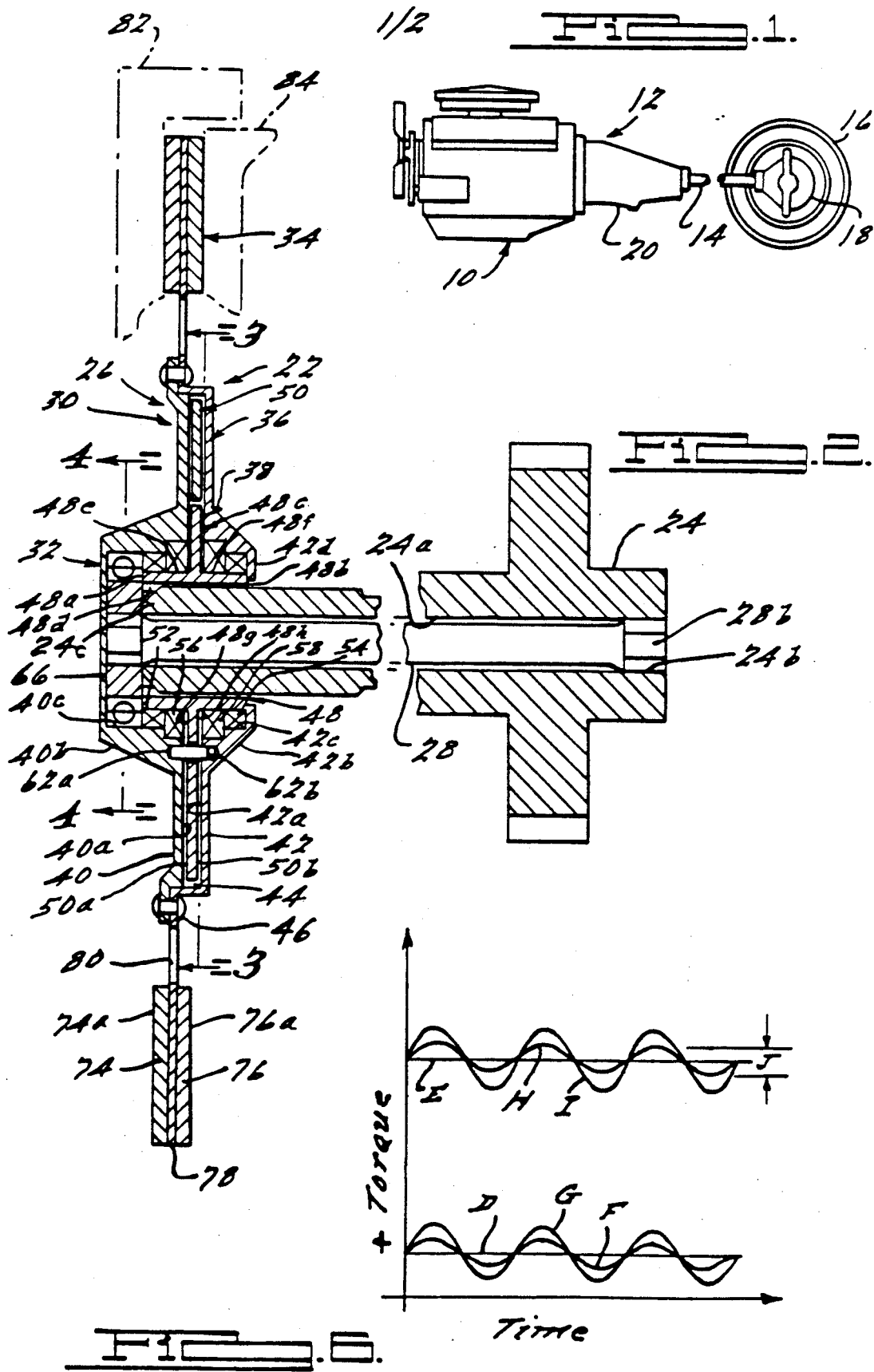

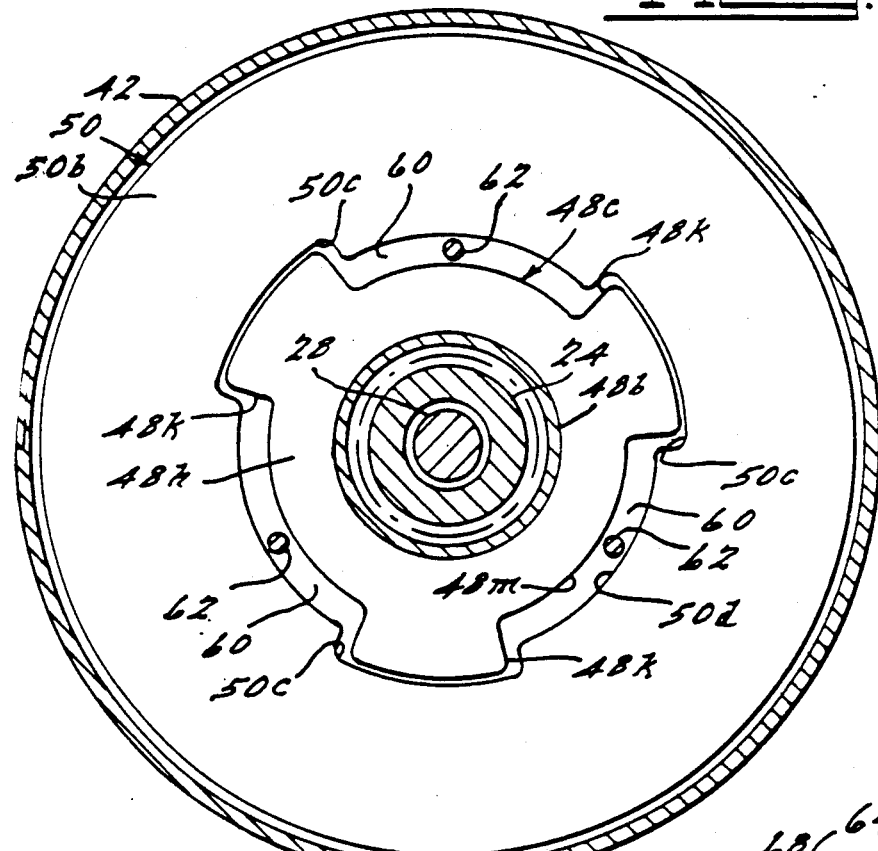
FIG. 3.
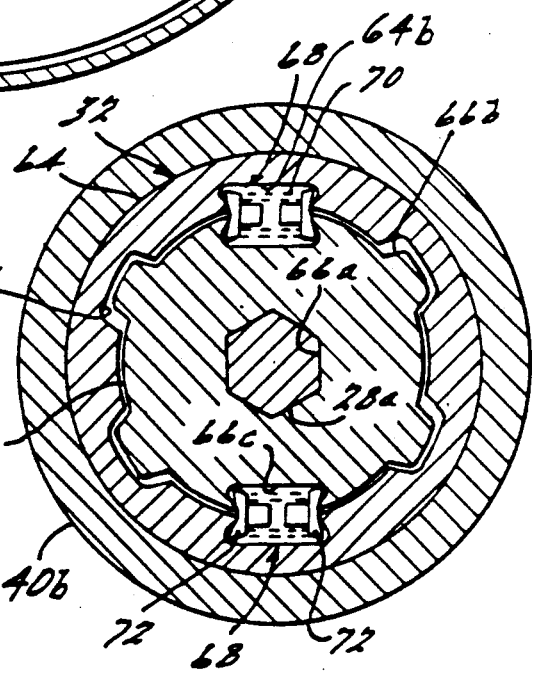
FIG. 5.
FIG. 4.

TORISONAL DAMPING MECHANISM

This application is a continuation of Application Ser. No. 111,472, filed Oct. 19, 1988 and now abandoned, which is a division of Application Ser. No. 793,802, filed Nob. 1, 1985 and now U.S. Pat. No. 4,782,932.

This application is related to U.S. Pat. Nos. 4,793,932; 4,790,537 and 4,576,259; and to U.S. Pat. application Ser. No. 087,587, filed Aug. 20, 1987 now U.S. Pat. No. 4,874,074. These patents and application are all assigned to the assignee of this application.

FIELD OF THE INVENTION

This disclosure relates to driveline torsion damping mechanisms operable over the entire operational range of a driveline. More specifically, the invention relates to such a mechanism for vehicle drivelines.

BACKGROUND OF THE INVENTION

It is well-known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which are often referred to as vibrations, are detrimental to driveline components and derogate passenger-ride quality. Further, the torsionals often cause driveline and vehicle body components to vibrate and produce annoying noises. An example of driveline vibration noise, known as idle rattle, occurs when a manual transmission is in neutral with its input shaft clutched to an engine running at or near idle speed; under such a condition low amplitude engine torsionals accelerate/decelerate (rattle) driven gears not under load. An example of body noise, known as body boom, occurs when an engine is lugged; under such a condition engine torsionals cause body components, such as sheet metal panels, to resonate. Still further, tip-in/tip-out torque pulses, produced by abrupt engine acceleration and/or deceleration, jerk the driveline and vehicle. Such torque pulses are also detrimental to the driveline and derogate passenger-ride quality. Herein, such torque pulses are generally referred to as torsionals. In view of the foregoing, vehicle torsional damping mechanisms, ideally, isolate and dampen torsionals which are detrimental to driveline components, which derogate passenger-ride quality, and which cause annoying driveline and vehicle body noises.

Since the inception of the automobile, many torsional damping mechanisms have been proposed and used to attenuate and dampen driveline torque changes and torsionals. For example, master clutches used in combination with manual shift mechanical transmissions have long employed torsional damping mechanisms having spring isolators and mechanical friction damper devices disposed in parallel with each other and respectively operative to attenuate and dampen driveline torque changes and torsionals when the amplitude of changing torque and torsionals exceeds the slip or breakaway torque of mechanical friction damper devices. With such damping devices, portions of amplitude changes less than the slip or breakaway torque are transmitted directly through the clutch without attenuation, i.e., flexing of the spring isolators Accordingly, such torsional damping mechanisms fail to provide attenuation and dampening of low amplitude torque changes and torsionals. Stated in somewhat different terms, such prior art torsional dampening mechanisms function as rigid links in drivelines when the amplitudes of torque changes and torsionals are less than the slip or breakaway torque of the mechanical friction damping devices.

The torsional damping devise disclosed herein is closely related to the torsional damping mechanism disclosed in copending U.S. application Ser. No. 631,363. The mechanism therein employs a pair of long travel torsion isolating springs which improve attenuation and a viscous damper which allows attenuation of torque changes and torsionals independent of their amplitude. The viscous damper therein provides an infinite range of damping levels since the viscous clutching surfaces therein are responsive to velocity rather than the amplitude of torque changes and torsionals. Further, a lost motion is provided to one of the viscous clutching surfaces for preventing damping of relatively low amplitude torque changes and torsionals. The torsional damping mechanism disclosed herein simplifies, improves, and reduces the inertia of the damper in copending application 631,363. Further, the damper herein is disposed in a master clutch plate assembly adapted to drivingly interconnect driving and driver members of a driveline.

SUMMARY OF THE INVENTION

An object of the present invention is to provide an improved torsion damping device for use in combination with a master clutch plate assembly selectively connectable between an engine and a transmission.

Another object of the present invention is to provide such a device which allows attenuation of virtually all torque changes and torsionals in driveline.

Another object of this invention is to provide a torsional damping mechanism having at least two stages of resilient means for attenuation torsionals and a single damping assembly which provides the correct amount of damping for both stages of the resilient means.

According to a feature of this invention, a torsional damping mechanism for a driveline comprises a damper assembly having first and second relatively rotatable clutch means disposed for clutching coaction therebetween and damping in response to the relative rotation; means for disposing at least first and second resilient means in series with each other, one of the resilient means being flexibly operative to attenuate torsionals when the driveline is connected to a load, and the other resilient means being flexibly operative to attenuate torsionals when the driveline is not connected to a load and being flexibly inoperative when the driveline is connected to a load. The invention is characterized by the means for disposing including means fixedly connecting the first and second resilient means respectively to the first and second clutch means for effecting the relative rotation and the clutching coaction in response to flexing of either of the resilient means.

According to another feature of this invention, the damping assembly is a viscous shear damper.

BRIEF DESCRIPTION OF THE DRAWINGS

The torsional damping mechanism of the present invention is shown in the accompanying drawings in which:

FIG. 1 is a schematic view of a motor vehicle driveline;

FIG. 2 is a sectional view of the torsional damping mechanism;

FIG. 3 is an enlarged sectional view of the torsional damping mechanism looking along line 3—3 of FIG. 2;

FIG. 4 is an enlarged sectional view of the torsional damping mechanism looking along line 4—4 of FIG. 2;

FIG. 5 is a graph schematically illustrating driveline torque as a function of relative angular rotation of portions of the torsional damping mechanism; and FIG. 6 is a graph schematically illustrating a band of low amplitude torsionals not dampened by a damping device in the torsional damping mechanism.

DETAILED DESCRIPTION OF THE DRAWINGS

The motor vehicle driveline seen schematically in FIG. 1 includes an internal combustion engine 10 and a transmission 12 having an output shaft 14 drivingly connected to a load such as a ground engaging wheel 16 via a differential gear assembly 18 for a rear and/or front axle of a vehicle. Transmission 12 includes a housing 20 containing a torsional damping mechanism 22 illustrated in FIGS. 2–4 and a plurality of unshown constant mesh ratio gears driven by a cluster gear shaft 24 partially shown in FIG. 2. Well-known ratio change clutches within the transmission are employed to selectively connect the engine with load driving shaft 14. Cluster gear shaft 24 functions as the transmission input shaft and as the torsional damping mechanism output.

Looking now specifically at the torsional damping mechanism 22 in FIGS. 2–4, the mechanism includes a clutch plate apparatus 26 and a torsion spring bar 28 disposed within a bore 24a in cluster gear shaft 24. Clutch plate apparatus 26 includes a viscous damper device 30, an idle rattle assembly 32, and a friction assembly 34. Damper device 30 includes an annular housing or first assembly 36 and an annular clutch assembly 38 disposed for rotation about a common axis defined by the rotational axis of shaft 24.

Housing assembly 36 includes first and second radially extending sidewall members 40, 42 having mutually facing clutching surfaces 40a, 42a defining a radially extending chamber 44 closed at its radially outer extent by mating portions of the sidewalls which are sealingly secured together by a plurality of fasteners 46. The radially inner extent of sidewalls 40, 42 respectively include hub portions 40b, 42b extending axially in opposite directions. Hub portion 40b includes a blind, stepped bore 40c and hub portion 42b includes stepped bore 42c having an annular shoulder 42d defining an opening for passage of shaft 24.

Clutch assembly 38 includes a hub member 48 and a clutching member 50. Hub member 48 includes annular hub portions 48a, 48b extending axially in opposite directions and a flange or disk portion 48c extending radially outward into chamber 44 from hub portions 48a, 48b. Hub portions 48a, 48b include a plurality of internal spline teeth 48d mating with external spline teeth at end 24c of shaft 24 and outer circumferential surfaces 48e, 48f for journaling sidewall hub portions 40b, 42b thereon via schematically illustrated bearings 52, 54.

Accordingly, hub member 48 is an assembly disposed for rotation relative to first assembly 36 and about a common axis therewith. Bearings 52, 54 may be of the antifriction bearing type but are preferably of the plain bearing type. Fluid leakage into and out of chamber 44 at its radially inner extent is prevented by dynamic seals 56, 58, which may be of the double lip elastomeric-type, pressed at their outer peripheries into stepped bores 40c, 42c and running respectively at their inner peripheries against surfaces 48e, 48f or against bearings 52, 54. Radially extending flange portion 48c includes oppositely facing surfaces 48g, 48h and three circumferentially spaced projections or teeth 48k formed on its circumferentially or radially outer surface portion 48m. Clutching member 50 includes oppositely facing surfaces 50a, 50b and three circumferentially spaced recesses 50c in its radially inner circumferential surface 50d. Recesses 50c loosely receive projections 48k and form therewith a lost motion means allowing minor to-and-fro relative angular rotation between hub member 48 and housing assembly 36 without corresponding to-and-fro relative angular rotation between the housing assembly and clutching member 50. The amount of lost motion may vary from driveline to driveline. For many applications, lost motions of 5 to 8 degrees seem to be acceptable. The precise amount of lost motion depends, for the most part, on driveline application, the amount of free play in the antirattle assembly 32 to be described hereinafter, etc. Alternatively, the lost motion means may be external of chamber 44; e.g. it may be disposed between shaft 24 and hub member 48.

As may be seen, clutching member 50 is free to move axially within chamber 44 and of course is free to move angularly in the chamber relative to hub member 48. Abrasion between surfaces 40a, 50a and 42a, 50b may be prevented by coating the surfaces with antiabrasion or antifriction material. The distance between surfaces 40a, 50a and 42a, 50b of course depends on the area of the surfaces, viscosity of the viscous liquid in chamber 44, and the amount of damping desired. The surfaces 40a, 50a and 42a, 50b may be provided with dished or recessed portions to vary damping or viscous clutching coaction as taught in copending U.S. application Ser. No. 631,363, which application is incorporated herein by which is now U.S. Pat. No. 4,608,883 and reference. Further, surfaces 48g, 48h of hub flange 48c may be closely spaced from surfaces 40a, 42a of housing sidewall members 40, 42 to provide viscous clutching coaction therebetween.

The outer and inner circumferential surfaces 48m and 50d of hub flange portion 48c and clutching member 50 are radially spaced apart to define arcuate recesses 60 between projections 48k. The maximum relative angular rotation between hub member 48 and housing assembly 36 is limited by stop means defined by the radial sides of projections 48k and stop pins 62 extending through each of the arcuate recesses 60. The stop arrangement herein limits the relative angular rotation to about 70 degrees. Pins 62 are anchored at their ends 62a, 62b in axially aligned blind bores in sidewall members 40, 42. Alternatively, the stop means may be external of chamber 44 and may react between one of the hub portions 48a, 48b and the housing assembly or between shaft 24 and the housing assembly.

Idle rattle means 32 provides resilient angular free play or lost motion between housing assembly 36 and torsion bar 28. The idle rattle means includes a ring gear member 64 pressed or otherwise securely fixed in blind bore 40c, a hub or intermediate member 66 having a central hexagonal opening 66a receiving a mating hexagonal end 28a of torsion spring bar 28, and two diametrically opposed spring assemblies 68. A hexagonal end 28b at other end of bar 28 is received in a mating hexagonal opening 24b in shaft 24. Member 4 includes four internal spline recesses 64a and two diametrically opposed spring assembly recesses 64b. Member 66 includes four external spline teeth 66b loosely received in internal spline recesses 64a and two diametrically opposed spring assembly recesses 66c which register with spring assembly recesses 64b. Spring assemblies 68 each include a helical coil spring 70 and two end members 72 which react between springs 70 and the radial sides of the spring assembly recesses to resiliently position spline teeth 66b *within spline recesses 64a* for resilient angular free play in both directions when torque is not being transmitted. Preferably, more angular free play is provided in the forward or positive torque directions, i.e., when torque is from housing assembly 36 to torsion bar 28. Alternatively, idle rattle means 32 may be positioned between friction assembly 34 and the housing assembly or between spring bar end 28b and shaft 24.

Idle rattle springs 70 are disposed in parallel with each other, springs 70 and are in turn in series with torsion spring bar 28 and the serially disposed springs 70,28 are in turn disposed in parallel with the damping or viscous clutching action of viscous damper 30. Deflection of springs 70 is limited by the amount of angular free play between spline recesses 64a and spline teeth 66b. The maximum combined deflection of this series-parallel spring arrangement, in terms of relative angular rotation between housing assembly 36 and cluster gear shaft 24, in limited by stop pins 62 of the stop means. Springs 70 are designed to provide a force sufficient to resiliently drive shaft 24 when the transmission is in neutral, i.e., when shaft 24 is not connected to a load. Hence, springs 70 are of a relatively low rate or stiffness compared to torsion spring bar 28 which is designed to transmit maximum driveline torque.

Friction clutch assembly 34 includes first and second axially facing friction surfaces 74a, 76a defined by friction material members 74, 76 secured on opposite sides of an annular radially extending flange or spider 78 disposed radially outward of or circumscribing the out circumferential extent of housing assembly 36. Herein, flange 78 is integrally formed with sidewall member 42, is flat and has friction members 74, 76 adhesively bonded thereto, and includes a plurality of circumferentially spaced lightening openings 80 which also provide flexibility. Alternatively, flange 78 may be formed separately and be axially resilient. For example, flange 78 may have a segmented wave washer shape to provide resiliency which is believed to lessen engagement shocks when friction surfaces 74a, 76a are clamped between partially shown pressure plates 82, 84 illustrated in phantom lines. The pressure plates are driven by the engine and are selectively actuated by an unshown engagement mechanism to effect a driving connection to cluster gear shaft 24 and to the load when the transmission is not in neutral.

Operation of the structure of torsional damping mechanism 22 may be more readily understood in view of graphs 5 and 6 in combination with the foregoing description. Graph schematically illustrates the so called steady-state driveline torque as a function of relative angular rotation between housing assembly 36 and cluster gear shaft 24 in response to deflection of idle rattle springs 70 and torsion spring bar 28. Curve A between points a and b represents positive and negative torque and rotation within the limits allowed by the free play in idle rattle assembly 32. Curves B and C respectively represent positive (forward) torque and negative (coast) torque when shaft 24 is under load.

Graph 6 schematically illustrates two driveline positive torque levels with the so called steady-state torques being represented by straight curves D and E and having sinusoidal curves F, G and H, I respectively superimposed thereon to represent torsionals of the different amplitudes. The lower amplitude torsionals, F and H, correspond to torque changes having a peak-to-peak torque change J which flexes torsion spring bar an amount less than or equal to the lost motion between projections 48k and recesses 50c in damper device 30. Accordingly, torsionals having amplitude less than or equal to torque change J effect relative rotation between housing assembly 36 and cluster gear shaft 24 without corresponding relative rotation between the housing assembly and clutching member 50 and without viscous clutching coaction between housing surfaces 40a, 42a and clutching member surfaces 50a, 50b. Hence, torsionals having an amplitude less than or equal to the torque change J are attenuated by torsion spring bar 28 without damping. The higher amplitude torsionals, such as torsionals G and I, are attenuated without damping for portions of their torque change which is less than torque change J, and are attenuated and dampened for the portions of their torque change which is greater than torque change J.

Functional advantages and features provided by torsional damping mechanism include resiliently driving cluster gear shaft with springs of low rate or low stiffness to prevent or reduce idle rattle, attenuation of all driveline torque changes and torsionals independent of the amplitude, dampening portions of torque changes and torsionals exceeding a predetermined amount, and attenuation of portions of torque changes and torsionals less than the predetermined amount without dampening. Further, mechanism 22 is configured to provide the above advantages and features with a structure of low inertia. For example, viscous damper 30 is concentrated about its rotational axis with the mass of sidewalls 40, 42 and clutching member 50 being minimized at their positions radially beyond the hub portions of the sidewalls. Further, inertia and the axial dimensions of device 30 are minimized by use of a torsion spring bar 28; by minimizing the thickness of hub flange 48c and clutching member 50; and by maintaining hub flange 48c, clutching member 50, and the lost motion means therebetween within the axially spaced surfaces defined by housing member surfaces 40a, 42a which are normal to the axis of rotation.

While a preferred embodiment of the present invention has been illustrated and described in detail, it will be apparent that various changes and modifications may be made in the disclosed embodiment without departing from the scope and spirit of the invention. A few of such changes and modifications have been mentioned herein. The appended claims are intended to cover the disclosed embodiment and all changes and modifications believed to be within the spirit of the invention.

What is claimed is:

1. A torsional vibration damping mechanism for a driveline, the mechanism comprising:
    a damper assembly having first and second relatively rotatable clutch means disposed for clutching coaction therebetween and damping of torsionals in response to the relative rotation;

means for disposing at least first and second resilient means in series with each other, one of the resilient means being flexibly operative to attenuate torsionals when the driveline is connected to a load, and the other resilient means being flexibly operative to attenuate torsionals when the driveline is not connected to a load and being flexibly inoperative when the driveline is connected to a load; characterized by:

the means for disposing including means fixedly connecting the first and second resilient means respectively to the first and second clutch means for effecting the relative rotation and the clutching coaction in response to flexing of either of said resilient means.

2. The mechanism of claim 1, wherein the clutching coaction increases in response to increasing relative rotational velocity of the clutch means.

3. The mechanism of claim 1, wherein the damper assembly comprises a viscous shear damper.

4. A torsional, and vibration damping mechanism adapted to be rotationally interposed in a driveline between an output drive of a prime mover and an input drive of a transmission having in-gear and neutral positions respectively connecting and disconnecting the input drive with a load; the mechanism comprising:

first and second assemblies disposed for relative rotation about a common axis and adapted to drivingly interconnect the drives;

an intermediate means disposed between the assemblies;

first resilient means interposed between one of the assemblies and the intermediate means;

second resilient means interposed between the intermediate means and the other assembly, the intermediate means connecting the first and second resilient means in series between the assemblies, one of the resilient means having a relatively high spring rate for flexible operation during the transmission in-gear positions, the other resilient means having a relatively low spring rate for flexible operation during the transmission neutral positions, and the other resilient means being saturated and nonflexible during the transmission in-gear positions;

a damper assembly including first and second clutching means disposed for clutching coaction in response to relative rotation therebetween, the first clutching means being in fixed driving relation with the first assembly; the improvement comprising;

means fixedly connecting the second clutching means to the second assembly for non-relative rotation therebetween, whereby flexing of either resilient means effects relative rotation of the clutching means and clutching coaction therebetween.

5. The mechanism of claim 4, wherein the damper assembly comprises a viscous shear damper.

6. A torsional mechanism for a driveline comprising a damper assembly and means for disposing at least first and second resilient means in series between drive and driven means, one of the resilient means having a relatively high spring rate and being flexibly operative to attenuate torsionals when the driveline is connected to a load, the other resilient means having a relatively low spring rate and being flexibly operative to attenuate torsionals when the driveline is not connected to a load and being flexibly inoperative when the driveline is connected to a load;

the damper assembly including annular housing and clutch assemblies mounted for limited relative rotation about a common axis, the housing assembly defining a chamber containing a viscous liquid and including a clutching surface fixed for rotation therewith, the clutch assembly including a first portion disposed in the chamber and having a clutching surface fixed for rotation therewith and closely spaced from the housing clutching surface for viscous clutching coaction therebetween in response to the relative rotation; characterized by:

means connecting the first and second resilient means respectively to the drive and driven means, and to the housing assembly and clutch assembly's first portion for effecting the relative rotation and the viscous clutching coaction in response to flexing of either of the resilient means, whereby both of the resilient means are viscously damped.

7. The mechanism of claim 6, wherein the clutch assembly includes a second portion having a clutching surface fixed for rotation therewith and closely spaced from a clutching surface fixed to rotate with the housing assembly for viscous clutching coaction therewith; and lost motion means interposed between the clutch assembly second portion and the second resilient means for preventing effective relative rotation of the housing assembly and second portion in response to flexing of the relatively low rate resilient means, whereby the damper assembly includes a first viscous damping stage operative in response to relative rotation effected by flexing of either resilient means and a second viscous damping stage operative in response to relative rotation exceeding the range of the lost motion.

8. The mechanism of claim 7, wherein the clutch assembly includes a hub in fixed driving relation with the driven means and the first portion, the second portion being disposed radially outward of the first portion and in radial alignment therewith, and the lost motion means being disposed between the first and second portions.

9. The mechanism of claim 6 and 7, wherein the flexible range of the second resilient means is substantially the same as the range of the lost motion means.

10. The mechanism of claim 8, wherein the flexible range of the second resilient means is substantially the same as the range of the lost motion means.

11. The mechanism of claim 6, wherein axial thickness and inertia of the damper assembly is reduced by forming the first portion of the clutch assembly of a relative thin member having flat surfaces facing axially in opposite directions, and forming at least the radially outer portion of the housing assembly of relatively thin members having flat axially facing surfaces with a minimum axial spacing therebetween for the clutch assembly first portion.

12. The mechanism of claim 11, wherein the inertia is further reduced by the first resilient means being a torsion spring shaft positioned along the common axis within a bore in the driven member.

13. The mechanism of claim 7, wherein axial thickness and inertia of the damper assembly is reduced by forming the first portion of the clutch assembly of a relatively thin member having flat surfaces facing axially in opposite directions, and forming at least the radially outer portion of the housing assembly of relatively thin members having flat axially facing surfaces with a minimum axial spacing therebetween for the clutch assembly first portion.

14. The mechanism of claim 13, wherein the inertia is further reduced by the first resilient means being a torsion spring shaft positioned along the common axis within a bore in the driven member.

* * * * *